(12) United States Patent
Baran, Jr. et al.

(10) Patent No.: US 7,141,612 B2
(45) Date of Patent: *Nov. 28, 2006

(54) STABILIZED FOAMS INCLUDING SURFACE-MODIFIED ORGANIC MOLECULES

(75) Inventors: Jimmie R. Baran, Jr., Prescott, WI (US); James S. Stefely, Woodbury, MN (US); Stephen W. Stein, Lino Lakes, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 292 days.

This patent is subject to a terminal disclaimer.

(21) Appl. No.: 10/334,963

(22) Filed: Dec. 31, 2002

(65) Prior Publication Data

US 2004/0127581 A1    Jul. 1, 2004

(51) Int. Cl.
*B01F 17/00* (2006.01)
*B01F 3/04* (2006.01)

(52) U.S. Cl. .................... 516/11; 521/50; 521/112

(58) Field of Classification Search .............. 516/115, 516/11

See application file for complete search history.

(56) References Cited

U.S. PATENT DOCUMENTS

| | | |
|---|---|---|
| 2,801,185 A | 7/1957 | Iler |
| 4,379,201 A | 4/1983 | Heilmann et al. |
| 4,455,205 A | 6/1984 | Olson et al. |
| 4,478,876 A | 10/1984 | Chung |
| 4,486,504 A | 12/1984 | Chung |
| 4,491,508 A | 1/1985 | Olson et al. |
| 4,522,958 A | 6/1985 | Das et al. |
| 4,737,559 A | 4/1988 | Kellen et al. |
| 5,037,579 A | 8/1991 | Matchett |
| 5,258,225 A | 11/1993 | Katsamberis |
| 5,387,617 A | 2/1995 | Hedstrand et al. |
| 5,401,785 A | 3/1995 | Kumagai et al. |
| 5,612,021 A | 3/1997 | Mellul |
| 5,648,407 A | 7/1997 | Goetz et al. |
| 5,879,715 A | 3/1999 | Higgins et al. |
| 6,001,342 A | 12/1999 | Forestier et al. |
| 6,004,567 A | 12/1999 | Marchi-Lemann et al. |
| 6,020,419 A | 2/2000 | Bock et al. |
| 6,068,835 A * | 5/2000 | Franzke et al. .......... 424/70.11 |
| 6,126,948 A | 10/2000 | Simonnet et al. |
| 6,177,414 B1 | 1/2001 | Tomalia et al. |
| 6,245,318 B1 * | 6/2001 | Klibanov et al. ......... 424/9.52 |
| 6,258,896 B1 | 7/2001 | Abuelyaman et al. |
| 6,280,748 B1 * | 8/2001 | Morita et al. ............... 424/401 |
| 6,391,326 B1 | 5/2002 | Crepeau et al. |
| 6,436,424 B1 | 8/2002 | Vogel et al. |
| 6,440,399 B1 | 8/2002 | Gers-Barlag et al. |
| 2002/0128336 A1 | 9/2002 | Kolb et al. |
| 2002/0160030 A1 | 10/2002 | Gers-Barlag et al. |
| 2002/0172716 A1 | 11/2002 | Walt et al. |
| 2003/0165553 A1 | 9/2003 | Gers-Berlag et al. |
| 2003/0228339 A1 | 12/2003 | El-Nokaly et al. |
| 2004/0067208 A1 | 4/2004 | Lennon et al. |

FOREIGN PATENT DOCUMENTS

| | | |
|---|---|---|
| EP | 0 608 908 A2 | 8/1994 |
| EP | 1 057 841 A2 | 12/2000 |
| EP | 1 017 745 B1 | 5/2001 |
| JP | 6-242543 | 9/1994 |
| JP | 2001-348214 A | 12/2001 |
| WO | WO 00/06495 | 2/2000 |
| WO | WO 01/85324 A1 | 11/2001 |

OTHER PUBLICATIONS

Website Article: Dendritech®, Inc., "Current Applications", http://www.dendritech.com/applications.html, Aug. 29, 2002.
Website Article: Dendritech®, Inc., "PAMAM Dendrimers", http://www.dendritech.com/pamam.html, Aug. 29, 2002.
Website Article: Dendritech®, Inc., "Pricing & Ordering Information", http://www.dendritech.com/pricing.html, Aug. 29, 2002.
"DISPERSANTS", Encyclopedia of Chemical Technology, Fourth Edition, Kirk-Othmer, vol. 8, Deuterium and Tritium to Elastomers, Polyethers, 1993, pp. 293-311.
Fisher et al., "Effect of Silica Nanoparticle Size on the Stability of Alumina/Silica Suspensions", J. Am. Comm. Soc., 84[4], pp. 713-718, 2001.
"EMULSIONS", Encyclopedia of Chemical Technology, Fourth Edition, Kirk-Othmer, vol. 9, Elastomers, Polyisoprene To Expert Systems, 1994, pp. 393-413.
"FOAMS", Encyclopedia of Chemical Technology, Fourth Edition, Kirk-Othmer, vol. 11, Flavor Characterization To Fuel Cells, 1994, pp. 783-805.
Tohver et al., "Nanoparticle Engineering of Complex Fluid Behavior", Langmuir 2001, 17, pp. 8414-8421.
Wasan et al., "New Vistas in Dispersion Science and Engineering", AIChE Journal, Mar. 2003, vol. 49, No. 3, pp. 550-556.
Website Article: Jacoby, "Nanoparticles Stabilize Colloids", Chemical & Engineering News, http://pubs.acs.org/cen/topstory/8001/8001notw8.html, Nov. 14, 2002.
"Nanotechnology could save the ozone layer", nanotechweb.org, Jan. 30, 2003.
Binks, "Particles as surfactants—similarities and differences", ELSEVIER, Current Opinion in Colloid & Interface Science 7 (2002), pp. 21-41.
U.S. Appl. No. 10/335,290, filed Dec. 31, 2002, Emulsions Including Surface-Modified Inorganic Nanoparticles, Case No. 58309US002.
U.S. Appl. No. 10/335,495, filed Dec. 31, 2002, Emulsions Including Surface-Modified Organic Molecules, Case No. 58311US002.

(Continued)

*Primary Examiner*—Randy Gulakowski
*Assistant Examiner*—Timothy J. Kugel

(57) ABSTRACT

The invention relates to stabilized gas-in-liquid dispersions or foams containing a liquid continuous phase, a dispersed gas phase, and surface-modified fullerenes, dendrimers, organic polymeric microspheres, or combinations thereof.

34 Claims, No Drawings

OTHER PUBLICATIONS

Mill et al., "Emulsion", in *AccessScience@McGraw-Hill*, http://www.accessscience.com, DOI 10.1036/1097-8542.231100, last modified: Apr. 10, 2000.

M. Samy El-shall, "Nanoparticles", in *AccessScience@McGraw-Hill*, http://www.accessscience.com, DOI 10.1036/1097-8542.YB031425, last modified: Dec. 23, 2002.

* cited by examiner

STABILIZED FOAMS INCLUDING SURFACE-MODIFIED ORGANIC MOLECULES

BACKGROUND

The invention relates to stabilized gas-in-liquid dispersions or foams.

Pure liquids generally cannot foam unless a surfactant or other material that reduces surface tension is present in the liquid. The surfactant functions by lowering the surface tension of the liquid such that a gas bubble introduced below the surface of the liquid can be maintained in the liquid. The surfactants can also stabilize the foam after it is formed. Such surfactants include, e.g., ionic, nonionic, and polymeric surfactants.

SUMMARY

In one aspect, the invention provides a foam that comprises a liquid continuous phase, a dispersed gas phase, and surface-modified organic molecules. The organic molecules are selected from surface-modified fullerenes, dendrimers, and combinations thereof.

In another aspect, the invention provides a foam composition that comprises a liquid continuous phase, a foaming agent, and surface-modified organic molecules.

In another aspect, the invention provides a foam that comprises a continuous phase of water, a dispersed gas phase, and organic polymeric microspheres.

In another aspect, the invention provides a foam composition that comprises a continuous phase of water, a foaming agent, and organic polymeric microspheres.

DETAILED DESCRIPTION

The foams of the invention are gas-in-liquid dispersions. The foams comprising a continuous phase and a dispersed gas phase are rendered by incorporation of an effective amount of surface-modified organic molecules or organic polymeric microspheres into the composition. The surface-modified organic molecules or organic polymeric microspheres stabilize or form the foam without reducing surface tension at the continuous-dispersed phase interface. In another embodiment, the foam consists essentially of a continuous phase, a dispersed gas phase, and surface-modified organic molecules, organic polymeric microspheres, or combinations thereof dispersed in the continuous phase.

In another embodiment, the invention is a foam composition that comprises a continuous phase, surface-modified organic molecules, or organic polymeric microspheres dispersed in the continuous phase, and a foaming agent. A foam composition may form foam by incorporation of a gas in the continuous phase. The dispersed gas, i.e., bubbles, may be at the surface of the continuous phase, dispersed within the continuous phase, or a combination of both.

In another embodiment, a foam composition of the invention consists essentially of a continuous phase, surface-modified organic molecules, organic polymeric microspheres, or a combination thereof, dispersed in the continuous phase, and a foaming agent.

The foams and foam compositions of the invention may be free of traditional surfactants, detergents, proteins, and emulsifiers, and other compounds that stabilize foam through a reduction in surface tension.

The surface-modified organic molecules and organic polymeric microspheres stabilize foams without lowering the surface tension at the interface between the dispersed and continuous phases. It is theorized that the surface-modified organic molecules or organic polymeric microspheres become situated between the dispersed phase gas droplets in increasing concentration as the liquid continuous phase drains from between the dispersed phase droplets. The increased concentration of surface-modified organic molecules between the dispersed phase gas droplets prevents the dispersed gas droplets from contacting one another and coalescing.

The surface-modified organic molecules and organic polymeric microspheres are substantially soluble in the continuous phase. The surface-modified organic molecules have surface groups that modify the solubility characteristics of the organic molecule. The surface groups are selected to render the organic molecule compatible with the continuous phase, including a component of the continuous phase, in which the composition, upon dispersing the gas, forms a foam.

Specific examples of useful surface-modified organic molecules include alkylated buckminsterfullerenes (fullerenes) and alklylated polyamidoamine (PAMAM) dendrimers. Specific examples of fullerenes include $C_{60}$, $C_{70}$, $C_{82}$, and $C_{84}$. Specific examples of PAMAM dendrimers include those of Generations 2 through 10 (G2–G10) available from Aldrich Chemical Company, Milwaukee, Wis. PAMAM dendrimers are currently commercially available with primary amine, hydroxyl, carboxylate sodium salt, mixed amine/hydroxyl, and $C_{12}$ surface functional groups. The alkyl groups on the organic molecules may be straight or branched and may range from at least $C_3$ to not greater than $C_{30}$ and may be any size or range in between $C_3$ and $C_{30}$. For example, the ranges may be $C_3$ to $C_{22}$; $C_3$ to $C_{18}$; $C_3$ to $C_{12}$; or $C_3$ to $C_8$, and any combination or integer therebetween. The surface-modified organic molecules may be present in the continuous phase at a level of at least 0.01 percent by weight.

Specific examples of a useful organic polymeric microspheres include microspheres that comprise polystyrene, available from Bangs Laboratories, Inc., Fishers, Ind., as powders or dispersions. Average particle sizes of the polystyrene microspheres range from at least 20 nm to not more than 60 nm. Current commercially available average particle sizes are 20, 30, 50, and 60 nm. The organic polymeric microspheres may be present in the continuous phase at a level of at least 0.01 percent by weight.

Prior to foaming, the continuous phase is a liquid including, e.g., a solution, emulsion, suspension, dispersion, syrup, and melt. The continuous phase is selected based upon the desired properties of the foam including, e.g., tack, stiffness, hardness, density, volume, transparency, flexibility, conformability, resilience, creep, strength modulus elongation, chemical resistance, temperature resistance, environmental resistance, and compressibility.

Examples of continuous phases include water and organic liquids including, e.g., acids, alcohols, ketones, aldehydes, amines, amides, esters, glycols, ethers, hydrocarbons, halocarbons, monomers, oligomers, lubricating oils, vegetables oils (including mono- di, and tri-glycerides), silicone oils, moisturizing oils (e.g., mineral and jojoba oils), fuel oils, fuels (including kerosene, gasoline, diesel fuel), oligomers of ethylene glycol, alkyl and aryl nitro compounds, partially or fully fluorinated compounds, and polymers.

Examples of useful organic continuous phases include natural and synthetic rubber resins including thermosettable rubbers as well as thermoplastic rubbers and elastomers including, e.g., nitrile rubbers (e.g., acrylonitrile-butadiene), polyisoprene rubber, polychloroprene rubber, polybutadiene rubber, butyl rubber, ethylene-propylene-diene monomer rubbers (EPDM), Santoprene® polypropylene-EPDM elastomers, ethylene-propylene rubber, styrene-butadiene copolymers, styrene-isoprene copolymers, styrene-butadiene-styrene rubber, styrene-isoprene-styrene rubber, styrene-ethylene-butylene-styrene rubber, styrene-ethylene-propylene-styrene rubber, polyisobutylene rubber, ethylene vinyl acetate rubbers, silicone rubbers including, e.g., polysiloxanes, methacrylate rubbers, polyacrylate rubbers including, e.g., copolymers of isooctyl acrylate and acrylic acid, polyesters, polyether esters, polyvinyl ethers, polyurethanes and blends, and combinations thereof, including e.g., linear, radial, star, and tapered block copolymers thereof.

Other useful elastomers include, e.g., fluoroelastomers including, e.g., polytrifluoroethylene, hexafluoropropylene, and fluorinated ethylene-propylene copolymers, fluorosilicones and chloroelastomers including, e.g., chlorinated polyethylene and combinations thereof.

Examples of useful thermoplastic resins include polyacrylonitrile, acrylonitrile-butadiene-styrene, styrene-acrylonitrile, cellulose, chlorinated polyether, ethylenevinylacetate, fluorocarbons including, e.g., polychlorotrifluoroethylene, polytetrafluoroethylene, fluorinated ethylene-propylene and polyvinylidene fluoride, polyamides including, e.g., polycaprolactam, polyhexamethylene adipamide, polyhexamethylene sebacamide, polyundecanoamide, polylauroamide and polyacrylamide, polyimides including, e.g., polyetherimide, polycarbonate, polyolefins including, e.g., polyethylene, polypropylene, polybutene and poly-4-methyl pentene, polyalkylene terephthalates including e.g., polyethyleneterephthalate, polyalkylene oxides including, e.g., polyphenylene oxide, polystyrene, polyurethane, polyisocyanurates, vinyl polymers including, e.g., polyvinyl chloride, polyvinyl acetate, polyvinyl alcohol, polyvinyl butyral, polyvinylpyrrolidone, polyvinylidene chloride, and combinations thereof.

Useful thermosettable resins include, e.g., polyesters and polyurethanes and hybrids and copolymers thereof including, e.g., acylated urethanes and acylated polyesters, amino resins (e.g., aminoplast resins) including, e.g., alkylated urea-formaldehyde resins, melamine-formaldehyde resin, acrylate resins including, e.g., acrylates and methacrylates, vinyl acrylates, acrylated epoxies, acrylated urethanes, acrylated polyesters, acrylated acrylics, acrylated polyethers, vinyl ethers, acrylated oils and acrylated silicones, alkyd resins, such as urethane alkyd resins, polyester resins, reactive urethane resins, phenolic resins including, e.g., resole resins, novolac resins and phenol-formaldehyde resins, phenolic/latex resins, epoxy resins including, e.g., bisphenol epoxy resins, aliphatic and cycloaliphatic epoxy resins, epoxy/urethane resin, epoxy/acrylate resin and epoxy/silicone resin, isocyanate resins, isocyanurate resins, polysiloxane resins including alkylalkoxysilane resins, reactive vinyl resins, and mixtures thereof.

The continuous phase may be selected to provide an adhesive composition including, e.g., pressure-sensitive, hot melt, thermoset and thermoplastic adhesive compositions. The continuous phase can include any pressure-sensitive adhesive composition including, e.g., solvent-coatable, hot-melt-coatable, radiation-curable (E-beam, actinic including, e.g., visible and UV, and thermal), water-based emulsion type adhesives, and combinations thereof. Suitable pressure-sensitive adhesive compositions include, e.g., tackified rubber adhesives, e.g., natural rubber, olefins, silicones, polyisoprenes, polybutadiene, polyurethanes, styrene-isoprene-styrene and styrene-butadiene-styrene block copolymers and other elastomers, and tackified and untackified acrylic adhesive compositions including copolymers of isooctyl acrylate and acrylic acid.

Acrylate pressure-sensitive adhesives are well known in the art. Many of these adhesives are copolymers of an alkyl ester of acrylic acid and, optionally, a minor portion of a co-monomer. Useful acrylic acid esters include acrylic or methacrylic acid esters of a monohydric alcohol having from 1 to 20 carbon atoms including, e.g., isooctyl acrylate, 2-ethylhexyl acrylate, isononyl acrylate, isodecyl acrylate, decyl acrylate, dodecyl acrylate, lauryl acrylate, hexyl acrylate, butyl acrylate, and octadecyl acrylate, and combinations thereof. Other useful monomers for acrylate-based adhesive compositions include ethylenically-unsaturated monomers including, e.g., cyclohexyl acrylate, isobornyl acrylate, N-octyl acrylamide, t-butyl acrylate, methyl methacrylate, ethyl methacrylate and propyl methacrylate, and combinations thereof. Other useful ethylenically unsaturated monomers include, e.g., acrylic acid, methacrylic acid, itaconic acid, substituted acrylamides including, e.g., N,N-dimethylacrylamide, N-vinyl-2-pyrrolidone, N-vinyl caprolactam, acrylonitrile, tetrahydrofurfuryl acrylate, glycidyl acrylate, 2-phenoxyethyl acrylate and benzyl acrylate, and combinations thereof.

The continuous phase can also include other ingredients including, e.g., initiators, curing agents, cure accelerators, catalysts, crosslinking agents, tackifiers, plasticizers, dyes, flame retardants, coupling agents, pigments, impact modifiers, flow control agents, foaming agents, fillers, glass and polymer microspheres and microparticles that are not surface-modified, other particles including electrically conductive particles, thermally conductive particles, fibers, antistatic agents, antioxidants, dissolved or soluble salts, dissolved or soluble drugs, and UV absorbers.

Where the continuous phase includes monomers, polymerization can be achieved by various conventional free radical polymerization methods, which can be chemical or radiation initiated, including, e.g., solvent polymerization, emulsion polymerization, suspension polymerization, bulk polymerization and radiation polymerization including, e.g., processes using actinic radiation including, e.g., visible and ultraviolet light, electron beam radiation, and combinations thereof.

Useful free radical initiators include thermal and photoactive initiators. The type of initiator used depends on the polymerization process. Examples of photoinitiators include benzoin ethers, such as benzoin methyl ether and benzoin isopropyl ether, substituted benzoin ethers, such as anisoin methyl ether, substituted acetophenones, such as 2,2-dimethoxy-2-phenylacetophenone, and substituted alpha-ketols, such as 2-methyl-2-hydroxypropiophenone.

The continuous phase can also include copolymeric photoinitiators including, e.g., 2-[4-(2-hydroxy-2-methylpropenoyl)phenoxy]ethyl-2-methyl-2-N-propenoylamino propanoate and the polymerizable photoinitiator available under the trade designation DAROCUR ZLJ 3331 from Ciba-Geigy Corp., Hawthorne, N.Y.; and photoacid generated initiators including, e.g., diaryliodoniumhexafluoroantimonate available under the trade designation SARCAT CD-1012 from Sartomer, Exton, Pa.; and triarylsulfonium hexafluorophosphate available under the trade designation SARCAT CD-1011, from Sartomer.

Examples of suitable thermal initiators include peroxides, such as benzoyl peroxide, dibenzoyl peroxide, dilauryl peroxide, cyclohexane peroxide, methyl ethyl ketone peroxide, hydroperoxides including, e.g., butyl hydroperoxide and cumene hydroperoxide, dicyclohexyl peroxydicarbonate, t-butyl perbenzoate, and azo compounds, for example, 2,2,-azo-bis(isobutyronitrile) (AIBN), and combinations thereof. Examples of commercially available thermal initiators include initiators available under the VAZO trade designation from DuPont Specialty Chemical, Wilmington, Del., including VAZO 64 (2,2'-azobis(isobutyronitrile)), VAZO 52, VAZO 65, and VAZO 68; as well as thermal initiators available under the trade designation LUCIDOL from Elf Atochem North America, Philadelphia, Pa.; and initiators available under the CELOGEN trade designation from Uniroyal Chemical Co., Middlebury, Conn.

An initiator is used in an amount effective to facilitate polymerization of the monomers present in the composition and the amount will vary depending upon, for example, the type of initiator, the molecular weight of the initiator, the intended application of the resulting adhesive composition, and the polymerization process including, e.g., the temperature of the process.

The composition may be cross-linked to alter the properties of the composition. Cross-linking can be achieved with or without a cross-linking agent by using high energy radiation, such as gamma or electron beam radiation. A cross-linking agent or a combination of cross-linking agents can be added to the mixture of polymerizable monomers to facilitate cross-linking.

Useful radiation curing cross-linking agents include multifunctional acrylates, such as those disclosed in U.S. Pat. No. 4,379,201, which include 1,6-hexanediol diacrylate, trimethylolpropane triacrylate, 1,2-ethylene glycol diacrylate, pentaerythritol tetraacrylate, 1,12-dodecanol diacrylate, and combinations thereof; and copolymerizable aromatic ketone co-monomers, such as those disclosed in U.S. Pat. No. 4,737,559, and incorporated herein. Suitable ultraviolet light sources include, e.g., medium pressure mercury lamps and ultraviolet black light.

A polymerizable monomer composition may also include a chain transfer agent. The chain transfer agent is preferably soluble in the monomer mixture prior to polymerization. Examples of suitable chain transfer agents include triethyl silane and mercaptans.

The dispersed phase in a foam is a gas. The gas may be introduced by mechanical means or by chemical means. Useful mechanical foaming means include, e.g., agitating, e.g., shaking, stirring, or whipping the composition, and combinations thereof, injecting gas into the composition, e.g., inserting a nozzle beneath the surface of the composition and blowing gas into the composition, and combinations thereof.

Useful chemical foaming means include, e.g., producing gas in situ through a chemical reaction, decomposition of a component of the composition including, e.g., a component that liberates gas upon thermal decomposition, evaporating a component of the composition including, e.g., a liquid gas, volatilizing a gas in the composition by decreasing the pressure on the composition or heating the composition, and combinations thereof.

In principle, any gas or vapor may be used to foam the composition including, e.g., gases from chemical foaming agents and physical foaming agents including, e.g., inorganic and organic foaming agents.

Examples of chemical foaming agents include water and azo-, carbonate- and hydrazide-based molecules including, e.g., 4,4'-oxybis (benzenesulfonyl)hydrazide, 4,4'-oxybenzenesulfonyl semicarbazide, azodicarbonamide, p-toluenesulfonyl semicarbazide, barium azodicarboxylate, azodiisobutyronitrile, benzenesulfonhydrazide, trihydrazinotriazine, metal salts of azodicarboxylic acids, oxalic acid hydrazide, hydrazocarboxylates, diphenyloxide-4,4'-disulphohydrazide, tetrazole compounds, sodium bicarbonate, ammonium bicarbonate, preparations of carbonate compounds and polycarbonic acids, and mixtures of citric acid and sodium bicarbonate, N,N'-dimethyl-N,N'-dinitrosoterephthalamide, N,N'-dinitrosopentamethylenetetramine, and combinations thereof.

Suitable inorganic foaming agents or gases include, e.g., nitrogen, argon, oxygen, nitrous oxide, water, air, helium, sulfur hexafluoride, and combinations thereof.

Useful organic gases or foaming agents include carbon dioxide, aliphatic hydrocarbons, aliphatic alcohols, fully and partially halogenated aliphatic hydrocarbons including, e.g., methylene chloride, and combinations thereof. Examples of suitable aliphatic hydrocarbon gases or foaming agents include members of the alkane series of hydrocarbons including, e.g., methane, ethane, propane, n-butane, isobutane, n-pentane, isopentane, and blends thereof. Useful aliphatic alcohols include, e.g., methanol, ethanol, n-propanol, and isopropanol, and combinations thereof. Suitable fully and partially halogenated aliphatic hydrocarbons include, e.g., fluorocarbons, chlorocarbons, and chlorofluorocarbons, and combinations thereof.

Examples of fluorocarbon gases and foaming agents include methyl fluoride, perfluoromethane, ethyl fluoride, 1,1-difluoroethane (HFC-152a), fluoroethane (HFC-161), 1,1,1-trifluoroethane (HFC-143a), 1,1,1,2-tetrafluoroethane (HFC-134a), 1,1,2,2 tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, perfluoropropane, dichloropropane, difluoropropane, perfluorobutane, perfluorocyclobutane, and combinations thereof.

Useful partially halogenated chlorocarbon and chlorofluorocarbon gases and foaming agents include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124), and combinations thereof.

Examples of useful fully halogenated chlorofluorocarbons include trichloromonofluoromethane (CFC-11), dichlorodifluoromethane (CFC-12), trichloro-trifluoroethane (CFC-113), dichlorotetrafluoroethane (CFC-114), chloroheptafluoropropane and dichlorohexafluoropropane, and combinations thereof.

The gases and/or foaming agents may be used as single components, in mixtures, and combinations thereof, as well as in mixtures with other co-foaming agents. The gas and/or foaming agent is added to the composition in an amount sufficient to achieve a desired foam density.

The foams and foam compositions of the invention may also contain surface-modified nanoparticles in combination with surface-modified organic molecules and organic polymeric microspheres. Surface-modified nanoparticles are described in U.S. Pat. No. 6,588,483, incorporated herein by reference for the description of the surface-modified inorganic nanoparticles.

The invention will now be described further by way of the following examples.

EXAMPLES

All solvents and reagents were obtained from Aldrich Chemical Company, Milwaukee, Wis., unless otherwise noted. All percents and amounts are by weight unless otherwise specified.

Preparation of Octyl-substituted STARBURST® Dendrimer, Generation 2 (Octyl-SG-2)

A 50 mL round-bottom flask was charged with 0.74 g (0.23 mol) of STARBURST® (PAMAM-OH) Dendrimer, Generation 2 (G2). N,N-Dimethylformamide (10 g) and triethylamine (0.37 g; 0.0036 mol) were added to the flask and the mixture was magnetically stirred until the dendrimer was dissolved. Octanoyl chloride (0.59 g; 0.0036 mol) was added to the flask dropwise via syringe over a period of about 5 minutes. The mixture was stirred at room temperature for about 2 hours, after which water (20 g) was added to the flask. The mixture was stirred at room temperature overnight. The reaction mixture was poured into a separatory funnel and was extracted with toluene (20 g). The phases were separated and the aqueous phase was extracted two more times with toluene (10 g each time). The combined toluene extracts concentrated to dryness using a rotary evaporator. The resultant orange-brown solid was dried in a vacuum oven at 60° C. and 250 mm Hg pressure for 3 hours. The dry solid was then dissolved in about 30 g of toluene. This solution was filtered through a 0.2 μm syringe filter (Gelman ACRODISC syringe filter, Waters Corp., Milford, Mass.) to afford a clear yellow solution. The toluene solution was concentrated to dryness on a rotary evaporator to give 1.13 g of an orange-brown solid. Analysis of the solid by nuclear magnetic resonance spectrometry indicated complete esterification of the hydroxyl groups.

Preparation of Octyl-substituted STARBURST® Dendrimer, Generation 4 (Octyl-SG-4)

A 50 mL round-bottom flask was charged with 0.33 g (0.023 mol) of STARBURST® (PAMAM-OH) Dendrimer, Generation 4 (G4). N,N-Dimethylformamide (10 g) and triethylamine (0.15 g; 0.0015 mol) were added to the flask and the mixture was magnetically stirred until the dendrimer was dissolved. Octanoyl chloride (0.24 g; 0.0015 mol) was added to the flask dropwise via syringe over a period of about 5 minutes. The mixture was stirred at room temperature for about 2 hours, after which water (20 g) was added to the flask. The mixture was stirred at room temperature overnight. The reaction mixture was poured into a separatory funnel and was extracted with toluene (20 g). The phases were separated and the aqueous phase was extracted two more times with toluene (10 g each time). The combined toluene extracts concentrated to dryness using a rotary evaporator. The resultant orange-brown solid was dried in a vacuum oven at 60° C. and 250 mm Hg pressure for 3 hours. The dry solid was then dissolved in about 30 g of tetrahydrofuran. This solution was filtered through a 0.2 μm syringe filter (Gelman ACRODISC syringe filter) to afford a clear yellow solution. The tetrahydrofuran solution was concentrated to dryness on a rotary evaporator to give 0.48 g of an orange-brown solid. Analysis of the solid by nuclear magnetic resonance spectrometry indicated complete esterification of the hydroxyl groups.

Preparation of Octyl-substituted $C_{60}$ (Octyl-$C_{60}$)

A 50 mL round-bottom flask was dried by passing a stream of nitrogen gas through it while heating the flask with a gas flame. After the flask had cooled, it was charged with 10 mL of dry tetrahydrofuran and 0.1 g $C_{60}$, and the solution was then deoxygenated by briefly bubbling dry nitrogen gas through it. A solution of octylmagnesium iodide in diethyl ether (20 mL) was added to the flask via syringe as the solution was magnetically stirred. The dark reaction mixture was allowed to stir under nitrogen atmosphere for 7 hours, after which time an additional 5 mL of the solution of octylmagnesium iodide was added to the flask via syringe. After an additional 16 hours, 10 mL of a 5% aqueous solution of $Na_2S_2O_3$ was added to the flask and the mixture was allowed to stir for 1 hour. The heterogeneous mixture was transferred to a separatory funnel and the organic phase was separated from the aqueous phase. This organic phase was dried in a glass dish at 70° C. to afford 0.28 g of a dark solid. Mass spectrometric analysis indicated that the solid was a mixture of compounds corresponding to the formula $C_{60}(C_8H_{17})_n$ where n=1 to 17 and where the average value of n is 11.

Examples 1–17

Solutions of the surface-modified compounds were made in toluene, at the concentrations specified in Table 1, by combining, in screw-cap glass vials, the calculated amount of surface-modified compound and 2 mL of toluene at 23° C. When the compounds were dissolved, the vial was shaken vigorously by hand for 15 seconds. The foam height and lifetime was then measured. Foam lifetime was considered to be the time until bubbles no longer formed a continuous chain around the top of the solution in the vial. The data are given in Table 1.

TABLE 1

| Example | Foaming Agent | Concentration | Foam Height | Foam Lifetime |
|---|---|---|---|---|
| Comparative 1 | None | N/A | No foam | No foam |
| 1 | Octyl-$C_{60}$ | 2% | 5 mm | 50 seconds |
| 2 | Octyl-$C_{60}$ | 1% | 2 mm | 26 seconds |
| 3 | Octyl-$C_{60}$ | 0.5% | 3 mm | 25 seconds |
| 4 | Octyl-$C_{60}$ | 0.25% | 5 mm | 30 seconds |
| 5 | Octyl-$C_{60}$ | 0.125% | 3 mm | 28 seconds |
| 6 | Octyl-SG-2 | 2% | 12 mm | 45 seconds |
| 7 | Octyl-SG-2 | 1% | 0.3 mm | 25 seconds |
| 8 | Octyl-SG-2 | 0.5% | 0.4 mm | 20 seconds |
| 9 | Octyl-SG-2 | 0.25% | 0.3 mm | 10 seconds |
| 10 | Octyl-SG-4 | 2% | 13 mm | 55 seconds |
| 11 | Octyl-SG-4 | 1% | 0.4 mm | 30 seconds |
| 12 | Octyl-SG-4 | 0.5% | 0.6 mm | 40 seconds |
| 13 | Octyl-SG-4 | 0.25% | 0.6 mm | 45 seconds |
| 14 | Octyl-SG-4 | 0.125% | 0.8 mm | 35 seconds |
| 15 | Octyl-SG-4 | 0.1% | 0.3 mm | 30 seconds |
| 16 | Octyl-SG-4 | 0.08% | 0.3 mm | 30 seconds |
| 17 | Octyl-SG-4 | 0.067% | 0.3 mm | 25 seconds |

Examples 18–21

Dispersions of polystyrene microspheres with particles sizes of 20 nm, 30 nm, 50 nm, and 60 nm, obtained from Bangs Laboratories, Inc., were made at a temperature of 23° C. and at a concentration of 2% in water in screw cap vials. The vials were shaken vigorously by hand for 15 seconds. The foam height and lifetime were then measured. Foam lifetime was considered to be the time until the bubbles no longer formed a continuous chain around the top of the liquid in the vial. The data are given in Table 2.

TABLE 2

| Example | Microsphere Diameter | Foam Height | Foam Lifetime |
|---|---|---|---|
| Comparative 2 | None | No foam | No foam |
| 18 | 17 nm | 55 mm | >12 hours |
| 19 | 25 nm | 50 mm | >12 hours |
| 20 | 33 nm | 15 mm | 3.75 hours |
| 21 | 48 nm | 12.5 mm | 3.75 hours |

All patents, patent applications, and publications cited herein are each incorporated by reference, as if individually incorporated. Foreseeable modifications and alterations of this invention will be apparent to those skilled in the art without departing from the scope and spirit of this invention. This invention should not be restricted to the embodiments set forth in this application for illustrative purposes.

What is claimed is:

1. A foam comprising:
    a continuous liquid phase selected from the group consisting of alcohols, aldehydes, ketones, esters, ethers, amines, amides, hydrocarbons, halocarbons, natural rubber resin, synthetic rubber resin, fluoroelastomer, thermosetting resins, and mixtures thereof comprising a plurality of surface-modified organic molecules dispersed in a continuous phase, said organic molecules comprising fullerenes; and
    a dispersed gas phase dispersed in said continuous phase, wherein the foam is free of surfactant.
2. The foam of claim 1 wherein the surface-modified organic molecules comprise alkyl surface groups.
3. The foam of claim 2 wherein the alkyl groups are at least $C_3$.
4. The foam of claim 2 wherein the alkyl groups are not greater than $C_{30}$.
5. The foam of claim 2 wherein the alkyl groups range from $C_3$ to $C_{22}$.
6. The foam of claim 2 wherein the alkyl groups range from $C_3$ to $C_{18}$.
7. The foam of claim 2 wherein the alkyl groups range from $C_3$ to $C_{12}$.
8. The foam of claim 2 wherein the alkyl groups are $C_3$ to $C_8$ and any combination or integer therebetween.
9. The foam of claim 1 wherein the organic molecules are $C_{60}$, $C_{70}$, $C_{82}$, or $C_{84}$ fullerenes, or combinations thereof.
10. The foam of claim 1 wherein the dispersed phase is selected from the group consisting of nitrogen, argon, oxygen, carbon dioxide, nitrous oxide, water, air, helium, sulfur hexafluoride, aliphatic hydrocarbons, aliphatic alcohols, fully and partially halogenated aliphatic hydrocarbons, and combinations of any of these.
11. The foam of claim 1 wherein the organic molecules are a mixture of fullerenes and dendrimers.
12. The foam of claim 1 further comprising surface-modified inorganic nanoparticles.
13. The foam of claim 1 wherein the continuous phase further comprises water.
14. A foam composition comprising:
    a liquid continuous phase selected from the group consisting of alcohols, aldehydes, ketones, esters, ethers, amines, amides, hydrocarbons, halocarbons, natural rubber resin, synthetic rubber resin, fluoroelastomer, thermosetting resins, and mixtures thereof;
    surface-modified organic molecules disposed in the continuous phase, said organic molecules comprising fullerenes; and
    a foaming agent.
15. The foam composition of claim 14 wherein the surface-modified organic molecules comprise alkyl surface groups.
16. The foam composition of claim 15 wherein the alkyl groups are at least $C_3$.
17. The foam composition of claim 15 wherein the alkyl groups are not greater than $C_{30}$.
18. The foam composition of claim 15 wherein the alkyl groups range from $C_3$ to $C_{22}$.
19. The foam composition of claim 15 wherein the alkyl groups range from $C_3$ to $C_{18}$.
20. The foam composition of claim 15 wherein the alkyl groups range from $C_3$ to $C_{12}$.
21. The foam composition of claim 15 wherein the alkyl groups are $C_3$ to $C_8$ and any combination or integer therebetween.
22. The foam composition of claim 15 further comprising surface-modified inorganic nanoparticles.
23. The foam composition of claim 14 wherein the organic molecules are fullerenes and dendrimers.
24. The foam of claim 23 further comprising surface-modified inorganic nanoparticles.
25. The foam composition of claim 14 wherein the foam composition is disposed within a container.
26. The foam composition of claim 14 wherein the foam is free of surfactant.
27. The foam composition of claim 14 wherein the organic molecules are $C_{60}$, $C_{70}$, $C_{82}$, or $C_{84}$ fullerenes.
28. The foam composition of claim 14 wherein the foaming agent is selected from the group consisting of nitrogen, argon, oxygen, carbon dioxide, nitrous oxide, water, air, helium, sulfur hexafluoride, aliphatic hydrocarbons, aliphatic alcohols, fully and partially halogenated aliphatic hydrocarbons, and combinations of any of these.
29. The foam composition of claim 14 wherein the continuous phase further comprises water.
30. A foam comprising:
    a continuous liquid phase comprising a plurality of organic polymeric micro spheres dispersed in a continuous phase comprising water; and
    a dispersed gas phase dispersed in said continuous phase, wherein the organic polymeric microspheres have an average particle size of at least 20 nm and not more than 60 nm.
31. The foam of claim 30 wherein the organic polymeric microspheres comprise polystyrene.
32. A foam composition comprising:
    a continuous liquid phase comprising a plurality of organic polymeric microspheres dispersed in a continuous phase comprising water wherein the organic polymeric microspheres have an average particle size of at least 20 nm and not more than 60 nm; and
    a foaming agent.
33. The foam composition of claim 32 wherein the foaming agent is selected from the group consisting of nitrogen, argon, oxygen, carbon dioxide, nitrous oxide, water, air, helium, sulfur hexafluoride, aliphatic hydrocarbons, aliphatic alcohols, fully and partially halogenated aliphatic hydrocarbons, and combinations of any of these.
34. The foam composition of claim 32 further comprising surface-modified inorganic nanoparticles.

* * * * *